United States Patent [19]

Trapasso et al.

[11] Patent Number: 5,048,643
[45] Date of Patent: Sep. 17, 1991

[54] HYDRAULIC LIFT PISTON SKIRT

[76] Inventors: Timothy Trapasso, 415 Oneida St., Fulton, N.Y. 13069; John J. Howland, RD. 3, Box 424 C, Lockwood Rd., Auburn, N.Y. 13021

[21] Appl. No.: 511,310

[22] Filed: Apr. 19, 1990

[51] Int. Cl.$^5$ .............................................. B60S 13/00
[52] U.S. Cl. .............................. 187/8.41; 277/212 FB
[58] Field of Search ....................... 187/8.41, 17, 1 R; 92/86; 277/24, 212 FB, 212 R, 212 F; 254/2 R, 2 B, 2 C, 93 R

[56] References Cited

U.S. PATENT DOCUMENTS

| | | | |
|---|---|---|---|
| 4,055,205 | 10/1977 | Withoff et al. | 277/212 F |
| 4,217,972 | 8/1980 | Jones | 187/8.41 |
| 4,673,034 | 6/1987 | Hansen | 277/212 F |
| 4,813,913 | 3/1989 | Belter | 277/212 FB |
| 4,819,919 | 4/1989 | Taylor | 277/212 FB |

Primary Examiner—Robert P. Olszewski
Assistant Examiner—Kenneth Noland
Attorney, Agent, or Firm—Katherine McGuire

[57] ABSTRACT

A flexible skirt for preventing debris such as dirt and rust, for example, from accumulating on the seal between the piston and cylinder of a hydraulic vehicle lift assembly. The skirt comprises an essentially flat piece of material cut or formed such that it has an inside perimeter of substantially the same diameter as the piston diameter and an outside perimeter of a larger, predetermined diameter. Two free ends extending from the inside to outside perimeter include releasable attachment means allowing the skirt to be wrapped around and encircle the piston with the two ends then attached back together. A series of spaced, through holes are provided in the skirt in the area between the inside and outside perimeter for passing bolts therethrough which have been removed from the underlying retaining ring which holds the seal in place. With the skirt placed around the piston and in covering relation to the retaining ring, the bolts are passed through the holes in the skirt and are secured back into their original holes in the retaining ring such that the skirt is secured thereto.

5 Claims, 1 Drawing Sheet

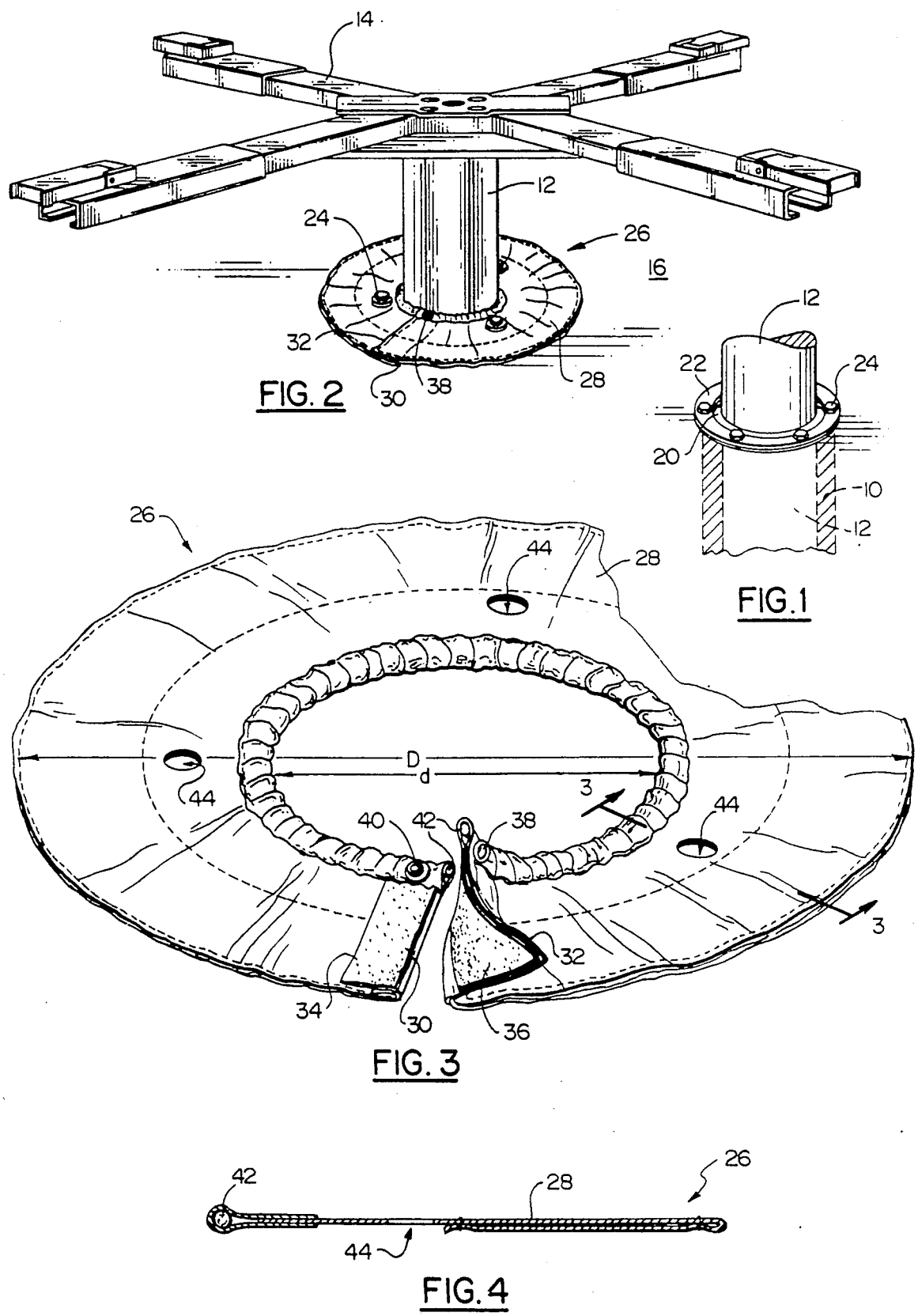

HYDRAULIC LIFT PISTON SKIRT

BACKGROUND OF THE INVENTION

This invention relates to apparatus designed to prevent foreign matter from contaminating and adversely affecting a hydraulic lift piston and, more particularly, to a novel and unique flexible skirt for attachment to the perimeter of the hydraulic lift piston above and adjacent the lift piston seal.

Hydraulic lifts are widely used today in the automobile industry to vertically lift a vehicle from the ground when attention and repair is required of the wheels and/or the general undercarriage of the vehicle. The typical hydraulic lift used for this purpose has the piston casing or cylinder located beneath ground level, or garage floor, upon which the repair person stands and, upon actuation, the piston moves vertically above and below the garage floor within the cylinder to raise and lower the vehicle as needed. In the fully extended position, the exterior of the piston becomes exposed and is at risk of damage to the otherwise smooth exterior of the piston body. Damage in the form of scoring or pitting of the piston exterior can occur as a result of foreign debris collecting near the garage floor hole containing the piston. Debris in the form of dirt, metallic particles, and absorbent "litter" thrown on the garage floor to absorb oil spills, for example, can collect around the perimeter of the piston and damage the exterior surface of the piston as the piston is lowered into the cylinder and cause extensive damage to the hydraulic lift assembly.

A seal secured by a retaining ring is located around the perimeter of the piston at the hole in the garage floor and acts as a gasket to keep the pressurized oil within the piston casing or cylinder from escaping. The seal typically accumulates a film of oil due to the oil present which lubricates the piston within the cylinder during operation of the lift. The oil on the seal results in attraction and accumulation of dirt and other relatively fine debris along the seal which may damage the piston exterior if it becomes lodged between the piston and seal.

It is therefore a main object of the present invention to provide a hydraulic lift skirt which provides protection to the lift assembly piston by preventing accumulation of debris on or near the seal.

It is a further object of the present invention to provide a hydraulic lift skirt which may be readily and easily attached above and adjacent the seal of conventional hydraulic lift assemblies.

It is another object of the present invention to provide a hydraulic lift skirt which protects against costly hydraulic lift repairs due to damage by contamination of the lift assembly from foreign debris commonly found in the immediate area of vehicle repair stations.

It is still another object of the present invention to provide a hydraulic lift skirt which is relatively inexpensive to manufacture and otherwise economically attractive.

SUMMARY OF THE INVENTION

The invention comprises a substantially flat and circular skirt having a predetermined outside diameter and an inside diameter of substantially the same diameter as the piston exterior or outside diameter when attached about the hydraulic assembly as will be described. The skirt is preferably made of a material which is flexible yet resistant to water, oil, chemical compounds, and fire. Elasticized cord is sewn or otherwise attached to the inner diameter portion of the skirt to ensure proper fitting and tightness of the skirt about the piston exterior. The skirt includes two free ends, each extending from the inner diameter of the skirt to the outer diameter and include means to releasably attach one end to the other end to complete the circular configuration of the skirt about the piston exterior. With the lift in the extended position, the skirt may be properly placed about the hydraulic assembly by removing a predetermined number of securing bolts from the retaining ring which, as aforementioned, holds the seal in place. The two free ends of the skirt are separated from each other such that the skirt can be placed around the piston and laid on top of the retaining ring. The free ends are then attached back together. The skirt includes a predetermined number of spaced through holes located between the inner and outer diameter of which should be lined up over the recesses exposed by the removed retaining ring botls. The removed bolts are then placed through the holes in the skirt and are secured in their original position, now with the skirt in covering relation to the retaining ring.

With the skirt thus in place, the seal is no longer exposed to dirt or other debris which may cause piston damage. The skirt effectively creates a second seal which is resistant to the common elements found in hydraulic lift settings. The skirt may also be easily removed, cleaned, and replaced, as needed.

BRIEF DESCRIPTION OF THE DRAWINGS

FIG. 1 is a perspective view of the piston and cylinder assembly of a conventional hydraulic lift assembly, shown partly broken away;

FIG. 2 is a perspective view of a hydraulic lift in a semi-extended position with the hydraulic lift skirt of the invention surrounding the piston exterior in the intended manner;

FIG. 3 is a perspective view of the skirt seen in FIG. 2; and

FIG. 4 is a side, elevational view of the skirt taken generally along section 3—3 in FIG. 3.

DETAILED DESCRIPTION

Referring now to the drawings, there is seen a conventional automotive hydraulic lift assembly in FIGS. 1 and 2. The typical assembly includes a cylinder 10 located beneath the surface of the garage floor 16. A piston 12 telescopically fits within cylinder 10 and, through associated remote controls in combination with the proper hydraulic elements, is able to move from a first position wherein the automotive support structure 14 is substantially adjacent to the garage floor 16 such that a vehicle can be moved into place over the support structure 14, to a second, fully extended position wherein the support 14 is raised vertically in the air such that a supported vehicle's undercarriage is exposed for a repair person's accessibility. A seal 20 is provided around the perimeter of piston 12 adjacent floor 16 and serves to keep the pressurized oil located between piston 12 and cylinder 10 from escaping. Seal 20 is held in place by retaining ring 22 which, in turn, is secured to cylinder 10 by a plurality of washers and bolts 24. Through continued use of the lift, seal 20 inevitably accumulates a film of oil which is present on the exterior of piston 12 as it moves within cylinder 10. The accumulated oil on seal 20 tends to attract debris such as dirt and rust which can score and pit the exterior of piston 12 when such particulate matter wedges between seal 20 and piston 12. The presence of such debris between seal 20 and piston 12 is highly undesirable since it can thus damage the otherwise smooth exterior of piston 12, this resulting in the probable failure of hydraulic operability due to pressurized oil escaping at the lesions. Extensive and expensive repair of the piston would then be required.

To prevent the accumulation of debris on or about seal 20, hydraulic lift skirt 26 is provided as seen in FIG. 2-4. Referring to FIG. 3, skirt 26 comprises a flexible piece of material 28 cut or otherwise formed into a ring shape having an inner diameter d and outer diameter D. The distance between the inner perimeter and outer perimeter of skirt 26 may vary according to need but is preferably approximately 4½". Material 28 should be resistant to such elements as fire, water, and oil, which are commonly found in the immediate area of an automobile repair garage. A material suitable for the purpose is conventional army duck which has been appropriately treated to withstand the said elements to a satisfactory degree. Skirt 26 includes two free ends 30 and 32 which have releasable attachment means such as hook and pile Velcro strips 34 and 36, respectively. Also included adjacent ends 30 and 32 and placed along the inner perimeter of skirt 26 are snap 38 and snap receiving means 40 which are provided as extra securing means of skirt 26 about piston 12.

To attach skirt 26 about piston 10 to protect both it and seal 20, the hydraulic lift is moved to its extended position wherein piston 12 is exposed, as seen in FIG. 2. It is suggested that jacks are placed beneath the vehicle support 14 for personal safety. Referring to FIG. 1, at least three bolts and washers 24 should be removed at equal distances about retaining ring 22. Velcro strips 34 and 36 are separated from each other and ends 30 and 32 are passed around piston 12 such that skirt 26 completely encircles piston 12, skirt 26 being allowed to lay upon retaining ring 22. With skirt 26 thus wrapped around piston 12, Velcro strips 34 and 36 are fastened together as is snap 38 to snap receiving means 40. As seen more clearly in FIGS. 3 and 4, the inner perimeter of skirt 26 includes sewn-in elasticized cord 42 which serves to tightly fit skirt 26 about piston 12 wherein the inner diameter d of skirt 26 is substantially equal to the outer diameter of the piston 12.

Skirt 26 includes three equally spaced holes 44 located approximately midway between the inner and the outer perimeter of skirt 26. With skirt 26 in place over retaining ring 22, holes 44 should be lined up directly over the holes where the bolts and washers 24 were previously removed. The removed bolts and washers 24 are then placed through holes 44 and secured into their original positions within retaining ring 22, thereby securing skirt 26 to retaining ring 22. It is noted that although three holes 44 are shown and described herein, in number of holes 44 can be provided in skirt 26 for this purpose, it merely being necessary that skirt 26 be firmly secured in its intended position.

As piston 12 is moved vertically up and down within cylinder 10, skirt 26 remains in place and prevents debris from accumulating on or about seal 20. The inner perimeter of skirt 26 containing elasticized cord 42 creates an effective seal around piston 12 in is thus successful in preventing debris from accumulating on or between seal 20 and piston 12.

What is claimed is:

1. Apparatus for preventing foreign debris from accumulating on the wiper seal encircling the piston of a hydraulic vehicle lift assembly comprising:
   a) a flexible skirt having first and second surfaces and including a substantially circular inside perimeter having an elastic cord and a diameter substantially the same as the diameter of said piston when attached therearound, and an outside perimeter of predetermined outline, said skirt inclutling at least two, adjacent, free edges, each of said edges extending from said inside perimeter to said outside perimeter;
   b) means to releasably attach said two free edges together; and
   c) means to secure said skirt around said piston in covering relation to said wiper seal.

2. Apparatus for preventing foreign debris from accumulating on the wiper seal encircling the piston of a hydraulic vehicle lift assembly comprising:
   a) a flexible skirt having first and second surfaces and including a substantially circular inside perimeter having an elastic cord and a diameter substantially the same as the diameter of said piston when attached therearound, and an outside perimeter of predetermined outline, said skirt including at least two, adjacent, free edges, each of said edges extending from said inside perimeter to said outside perimeter;
   b) means to releasably attach said two free edges together wherein said releasable attachment means comprises a pile Velcro strip fixedly attached to said first surface of said skirt adjacent a first of said two edges and a hook Velcro strip fixedly attached to said second surface of said skirt adjacent the second of said two edges such that said hook Velcro strip may be placed in covering relation over said pile Velcro strip whereby said two free edges are releasably attached together; and
   c) means to secure said skirt around said piston in covering relation to said wiper seal.

3. The invention according to claim 2 and further comprising snap means fixedly attached to each of said two edges adjacent said inside perimeter such that a first of said two edges may be releasably attached to the second of said two edges.

4. The invention according to claim 2 wherein said skirt securing means comprises a plurality of through holes extending from said first surface to said second surface in said skirt between said inside and outside perimeters for receiving a plurality of bolts therethrough wherein said bolts are secured into a plurality of recesses encircling said wiper seal.

5. The invention according to claim 4 wherein said skirt securing means comprises three equally spaced through holes extending from said first side to said second side in said skirt between said inside and outside perimeters for receiving three bolts therethrough wherein said bolts are secured into three equally spaced recesses encircling said wiper seal.

* * * * *